(12) United States Patent
Gatherer

(10) Patent No.: US 6,198,774 B1
(45) Date of Patent: Mar. 6, 2001

(54) METHOD AND APPARATUS FOR RESOLVING SPECTRAL INVERSION AMBIGUITIES IN CODED DATA

(75) Inventor: Alan Gatherer, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/035,637

(22) Filed: Mar. 5, 1998

Related U.S. Application Data

(60) Provisional application No. 60/039,069, filed on Mar. 7, 1997.

(51) Int. Cl.[7] .............................. H04L 23/02; H04L 5/12
(52) U.S. Cl. ........................................................ 375/261
(58) Field of Search .................. 375/261, 269, 375/271, 279, 280, 281, 298, 302, 308, 320, 322, 324, 329, 332; 370/206, 207; 329/304; 332/103

(56) References Cited

U.S. PATENT DOCUMENTS 5,974,090 * 10/1999 Hirao et al. ........................ 375/261

* cited by examiner

Primary Examiner—Stephen Chin
Assistant Examiner—Betsy L. Deppe
(74) Attorney, Agent, or Firm—Warren Franz; Wade James Brady III; Frederick J. Telecky, Jr.

(57) ABSTRACT

Spectral ambiguities are resolved in transmitting data across a data communications channel from a local transmitter to a remote receiver using a quadrature amplitude modulation (QAM) scheme by augmenting the encoding-decoding process at the transmitter and receiver. At the transmitter, the encoding process is augmented by converting the mappings $(I_k, Q_k)$ into mappings $(\tilde{I}_k, \tilde{Q}_k)$, where $\tilde{I}_k = I_k$ and $\tilde{Q}_k = |Q_k|\alpha_k$ and wherein $\alpha_k = \text{sign}(\tilde{Q}_{k-1})\text{sign}(Q_k)$. At the receiver, the decoding process is augmented by converting the mappings $(\tilde{I}_k, \tilde{Q}_k)$ into mappings $(\tilde{\tilde{I}}_k, \tilde{\tilde{Q}}_k)$, where $\tilde{\tilde{I}}_k = \tilde{I}_k$ and $\tilde{\tilde{Q}}_k = |\tilde{Q}_k|\beta_k$ and wherein $\beta_k = \text{sign}(\tilde{Q}_k)\text{sign}(\tilde{Q}_{k-1})$.

1 Claim, 1 Drawing Sheet

METHOD AND APPARATUS FOR RESOLVING SPECTRAL INVERSION AMBIGUITIES IN CODED DATA

This application claims priority under 35 U.S.C. § 119 (e)(1) of provisional application Ser. No. 60/039,069 filed Mar. 7, 1997, entitled "Method and Apparatus for Resolving Spectral Inversions in Coded Data," the entirety of which is incorporated herein by reference.

The present invention relates generally to data communications; and, in particular, to methods and apparatus for resolving ambiguities in Quadrature Amplitude Modulation (QAM) and other similarly coded data.

BACKGROUND OF THE INVENTION

In Quadrature Amplitude Modulation (QAM) techniques both amplitude and phase are used to represent the data contained within the signal. Often 8-QAM to 256-QAM systems are used in applications such as wireline communications. Data is transmitted in a QAM modulation scheme with the data contained within the amplitude and phase of the transmitted signal. In a typical system, for every n bits of data, a QAM symbol (Ik, Qk) is generated using some constellation encoder, where Ik is the kth real amplitude and Qk is the kth imaginary amplitude of the signal. In conventional systems, the signal is transmitted through a modulator which converts the signal into analog waveform for transmission through a channel to a remote location. The remote location includes a demodulator which converts the received analog waveform into a QAM constellation point, and a constellation decoder which converts the QAM constellation point back into n bits.

Usually the constellation encoder-decoder elements are designed to correct for phase ambiguities in the received QAM constellation point. See, for example, U.S. Pat. No. 5,233,630, the entirety of which is incorporated herein by reference. Overlooked, however, is the effect of spectral inversion or "mirroring" across an axis (typically, the I axis). This occurs, for example, when the signal is frequency stacked such as in cable modem system.

Thus, there is a need to design encoder-decoder elements in a constellation system that correct for spectral inversion.

SUMMARY OF THE INVENTION

The invention provides methods and apparatus to correct for spectral inversion occurring during transmission in a QAM or similar encoding system.

DETAILED DESCRIPTION OF PREFERRED EMBODIMENTS

Figure 1:
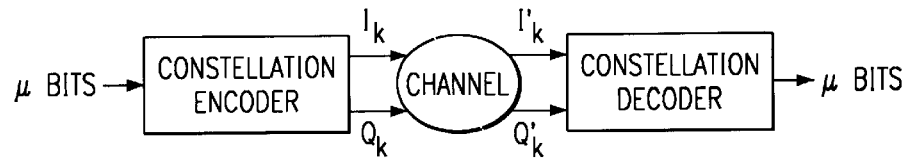
FIG. 1 is a block diagram of a constellation encode-decode system in accordance with the prior art.
Figures 2, 3:
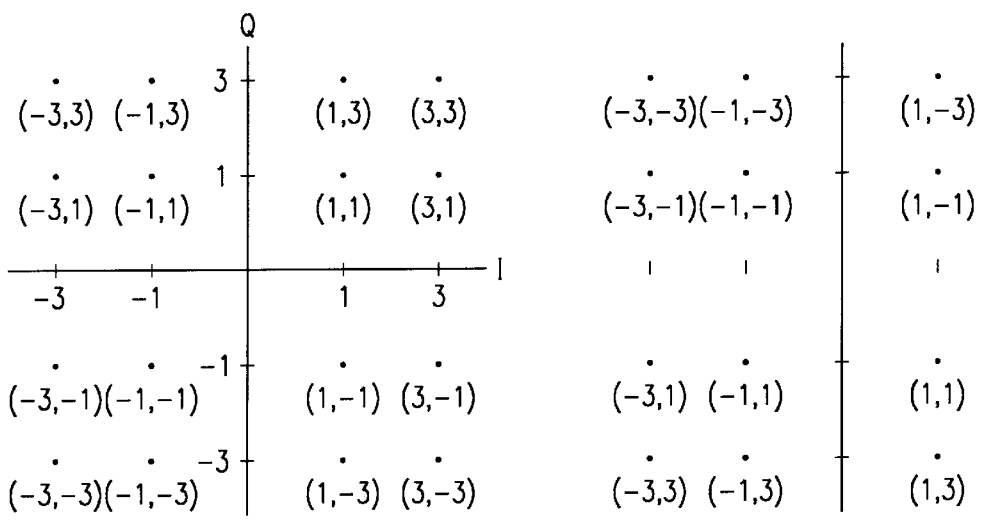
FIG. 2 is a constellation mapping example of an output of the constellation encoder of FIG. 1.
FIG. 3 is a constellation mapping example of spectral inversion of the mapping of FIG. 2 occurring in the system of FIG. 1.

FIG. 1 shows a conventional constellation encode-decode system such as used in a wireline modem system for transmitting data across telephone or cable lines from a local transmitter to a remote receiver. As shown, a series of n bits of data are converted into a series of constellation mappings (Ik, Qk), a mapping example of which is shown in FIG. 2. The coded data is transmitted across a channel to the remote site, where it is received as (Ik', Qk'), a distorted version of the same constellation mapping. If part of the distortion in the constellation mapping is due to spectral inversion, the example constellation of FIG. 2 may be remapped, for example, as illustrated in FIG. 3. Here, it can be seen, that the imaginary or Qk term in each point has been negated, corresponding to a mirroring transposition about the real or I axis. In this case, prior art constellation decoders will fail to correctly decode the received distorted constellation, at least for the spectral inversion.

Figure 4:
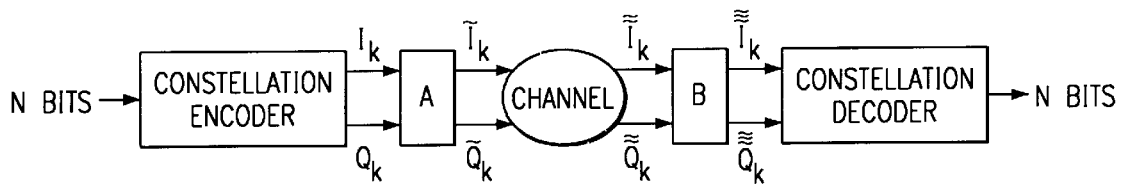
FIG. 4 is a block diagram of a constellation encode-decode system in accordance with the invention.

In accordance with the invention, the encoder-decoder system is augmented by encoder block A and decoder block B shown in FIG. 4. The operations of encoder A is described, as follows:

$$\tilde{I}_k = I_k \text{ and } \tilde{Q}_k = |Q_k|\alpha_k \text{ where } \alpha_k = \text{sign}(\tilde{Q}_{k-1})\text{sign}(Q_k)$$

The operation of decoder B is as follows:

$$\tilde{\tilde{I}}_k = \tilde{I}_k \text{ and } \tilde{\tilde{Q}}_k = |\tilde{Q}_k|\beta_k \text{ where } \beta_k = \text{sign}(\tilde{\tilde{Q}}_k)\text{sign}(\tilde{\tilde{Q}}_{k-1}).$$

With blocks A and B added to the sytem as shown in FIG. 4, the system will function correctly both in the absence or presence of spectral inversion.

For example, assuming the input to the channel has been in the zero quadrant for some time, and then the data stream is:

| $I_k$ | −3 | 1 | 5 | 7 | −3 | −1 | −7 |
|---|---|---|---|---|---|---|---|
| $Q_k$ | 1 | −5 | 7 | 3 | −3 | −5 | −1 | then the output of encoder A is:

| $\tilde{I}_k$ | −3 | 1 | 5 | 7 | −3 | −1 | −7 |
|---|---|---|---|---|---|---|---|
| $\tilde{Q}_k$ | 1 | −5 | 7 | 3 | −3 | −5 | −1 |

The channel may or may not introduce spectral inversion to the signal. Thus, the two alternative outputs from the channel take the following form:

| $\tilde{I}_k$ | −3 | 1 | 5 | 7 | −3 | −1 | −7 | OR | $\tilde{I}_k$ | −3 | 1 | 5 | 7 | −3 | −1 | −7 |
|---|---|---|---|---|---|---|---|---|---|---|---|---|---|---|---|---|
| $\tilde{Q}_k$ | 1 | −5 | −7 | −3 | 3 | −5 | 1 | OR | $\tilde{Q}_k$ | −1 | 5 | 7 | 3 | −3 | 5 | −1 |

Regardless of which output occurs, decoder B will act to produce the same signal as the input to encoder A, compensating for any spectral inversion that might occur:

| $\check{I}_k$ | -3 | 1 | 5 | 7 | -3 | -1 | -7 | OR | $\check{I}_k$ | -3 | 1 | 5 | 7 | -3 | -1 | -7 |
| $\check{Q}_k$ | 1 | -5 | -7 | -3 | 3 | -5 | 1 | OR | $\check{Q}_k$ | -1 | 5 | 7 | 3 | -3 | 5 | -1 |

What is claimed is:

1. A method for resolving spectral ambiguities in transmitting data across a data communications channel from a local transmitter to a remote receiver using a Quadrature Amplitude Modulation (QAM) scheme to encode the data within amplitude and phase information of a transmitted signal, the method comprising:

converting a series of n bits of data into a series of QAM constellation mappings ($I_k$, $Q_k$), such that for every n bits of data a QAM coded signal is generated using a constellation encoder, where $I_k$ is the kth real amplitude and $Q_k$ is the kth imaginary amplitude of the signal;

further converting the mappings ($I_k$, $Q_k$) into mappings ($\hat{I}_k$, $\hat{Q}_k$), where $\hat{I}_k = I_k$ and $\hat{Q}_k = |Q_k|\alpha_k$ and wherein $\alpha_k = \text{sign}(\hat{Q}_{k-1})\text{sign}(Q_k)$;

transmitting the coded data signal across the channel and receiving it at the remote receiver;

converting the received signal mappings ($\tilde{I}_k$, $\tilde{Q}_k$) into mappings ($\tilde{\tilde{I}}_k$, $\tilde{\tilde{Q}}_k$), where $\tilde{\tilde{I}}_k = \tilde{I}_k$ and $\tilde{\tilde{Q}}_k = |\tilde{Q}_k|\beta_k$ and wherein $\beta_k = \text{sign}(\tilde{Q}_k)\text{sign}(\tilde{Q}_{k-1})$;

further converting the mappings ($I_k$, $Q_k$) back into the series of n bits of data using a constellation decoder.

* * * * *